US008965465B2

(12) United States Patent
Spoto et al.

(10) Patent No.: US 8,965,465 B2
(45) Date of Patent: *Feb. 24, 2015

(54) PORTABLE ELECTRONIC DEVICE HAVING AT LEAST ONE OF RESONATOR AND SHIELD

(71) Applicant: Research In Motion Limited, Waterloo (CA)

(72) Inventors: Jay Robert Spoto, Boynton Beach, FL (US); Douglas Wayne Moskowitz, Weston, FL (US); Paul Brian Koch, Plantation, FL (US); Marko Antonio Escalante, Miramar, FL (US)

(73) Assignee: BlackBerry Limited, Waterloo (CA)

( * ) Notice: Subject to any disclaimer, the term of this patent is extended or adjusted under 35 U.S.C. 154(b) by 11 days.

This patent is subject to a terminal disclaimer.

(21) Appl. No.: 13/786,069

(22) Filed: Mar. 5, 2013

(65) Prior Publication Data

US 2013/0178254 A1 Jul. 11, 2013

Related U.S. Application Data

(63) Continuation of application No. 12/943,368, filed on Nov. 10, 2010, now Pat. No. 8,417,301.

(60) Provisional application No. 61/304,534, filed on Feb. 15, 2010.

(51) Int. Cl.
*H04M 1/00* (2006.01)
*H04M 1/02* (2006.01)
*H01Q 1/24* (2006.01)
*H01Q 5/00* (2006.01)
*H04B 1/38* (2006.01)

(52) U.S. Cl.
CPC ............. *H04M 1/0235* (2013.01); *H01Q 1/243* (2013.01); *H01Q 5/0062* (2013.01)
USPC .................... 455/575.4; 455/575.7

(58) Field of Classification Search
USPC ................ 455/575.1, 575.4–575.7
See application file for complete search history.

(56) References Cited

U.S. PATENT DOCUMENTS 7,328,047 B2  2/2008  Zhu et al.
7,403,160 B2  7/2008  Chiang et al.
(Continued)

FOREIGN PATENT DOCUMENTS

EP  1990980 A1  11/2008
EP  2362612 B1  5/2012

OTHER PUBLICATIONS

Vainikainen et al.; Resonator-Based analysis of the combination of mobile handset antenna and chassis, IEEE Transactions on antennas and propagation, vol. 50 No. 10, Oct. 2002, pp. 1433-1444.
(Continued)

*Primary Examiner* — Lee Nguyen
(74) *Attorney, Agent, or Firm* — Novak Druce Connolly Bove + Quigg LLP

(57) ABSTRACT

In some aspects, a portable electronic device, having a rear housing, an upper housing coupled to the rear housing and slideable relative thereto between a closed position and an open position, an antenna, and at least one element coupled to the antenna and configured to perform at least one of inhibiting low frequency shift and increasing high frequency sensitivity of the antenna.

20 Claims, 11 Drawing Sheets

(56) References Cited

U.S. PATENT DOCUMENTS

| | | |
|---|---|---|
| 7,526,326 B2 | 4/2009 | Vance et al. |
| 7,672,700 B2 | 3/2010 | Oda |
| 7,876,274 B2 | 1/2011 | Hobson |
| 7,877,123 B2 | 1/2011 | Abdul-Gaffoor |
| 8,417,301 B2 * | 4/2013 | Spoto et al. ............. 455/575.4 |
| 2006/0135090 A1 | 6/2006 | Annamaa |
| 2006/0208951 A1 | 9/2006 | Korva et al. |
| 2006/0238423 A1 | 10/2006 | Ozden |
| 2007/0236398 A1 | 10/2007 | Nam |
| 2008/0018543 A1 | 1/2008 | Baliarda et al. |
| 2008/0300028 A1 | 12/2008 | Uejima et al. |
| 2009/0005134 A1 | 1/2009 | Abdul-Gaffoor et al. |
| 2009/0322619 A1 | 12/2009 | Ollikainen et al. |

OTHER PUBLICATIONS

Extended European search report mailed Mar. 18, 2011, in corresponding European patent application No. 10190598.2.

* cited by examiner

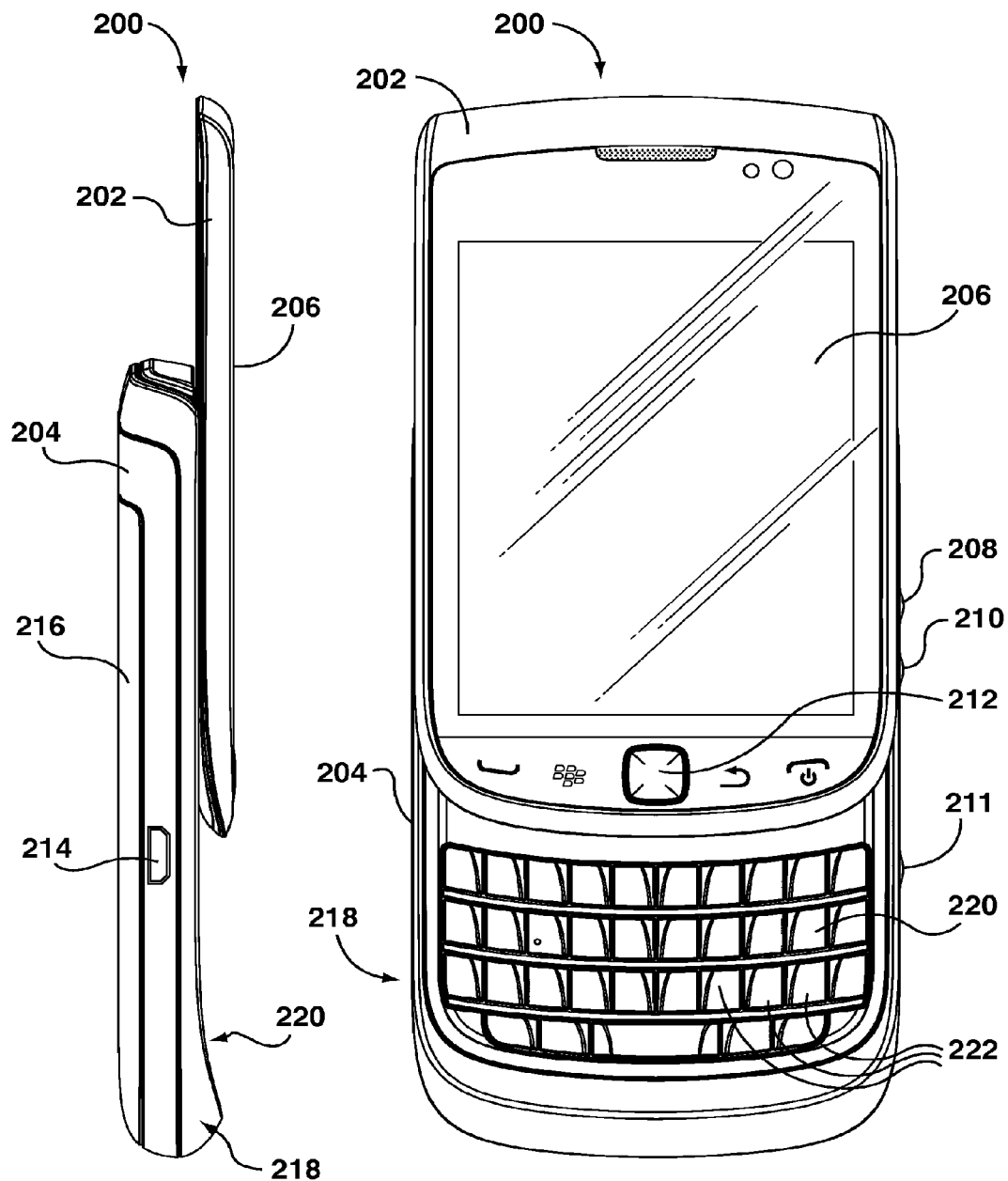

PORTABLE ELECTRONIC DEVICE HAVING AT LEAST ONE OF RESONATOR AND SHIELD

RELATED APPLICATIONS

This application is a continuation of U.S. patent application Ser. No. 12/943,368 filed on Nov. 10, 2010, which claims the benefit of U.S. Provisional Patent Application Ser. No. 61/304,534 filed Feb. 15, 2010, the entire contents of each application are hereby incorporated by reference herein for all purposes.

FIELD

The embodiments herein relate to portable electronic devices, and more particularly to portable electronic devices having a slidable upper housing and rear housing movable between an open position and a closed position, an antenna, and having at least one of a resonator and a shield.

INTRODUCTION

Electronic devices, including portable electronic devices, have gained widespread use and may provide a variety of functions including, for example, telephonic, electronic text messaging and other personal information manager (PIM) application functions. Portable electronic devices can include several types of devices including mobile stations such as cellular phones, smart phones, Personal Digital Assistants (PDAs), tablet computers and laptop computers.

Devices such as PDAs or smart phones are generally intended for handheld use and ease of portability. Smaller devices are generally desirable for portability. Touch-sensitive devices constructed of a display, such as a liquid crystal display (LCD), with a touch-sensitive overlay may be useful on such handheld devices as such handheld devices tend to be small and therefore limited in space available for user input and output devices. Further, the screen content on the touch-sensitive devices can normally be modified depending on the functions and operations being performed.

BRIEF DESCRIPTION OF THE DRAWINGS

Embodiments of the present disclosure will now be described, by way of example only, with reference to the attached Figures, wherein:

FIG. 6 is a first side view of the portable electronic device of FIG. 2 shown in an open position;

FIG. 7 is a front view of the portable electronic device of FIG. 6;

DETAILED DESCRIPTION

Figure 1:
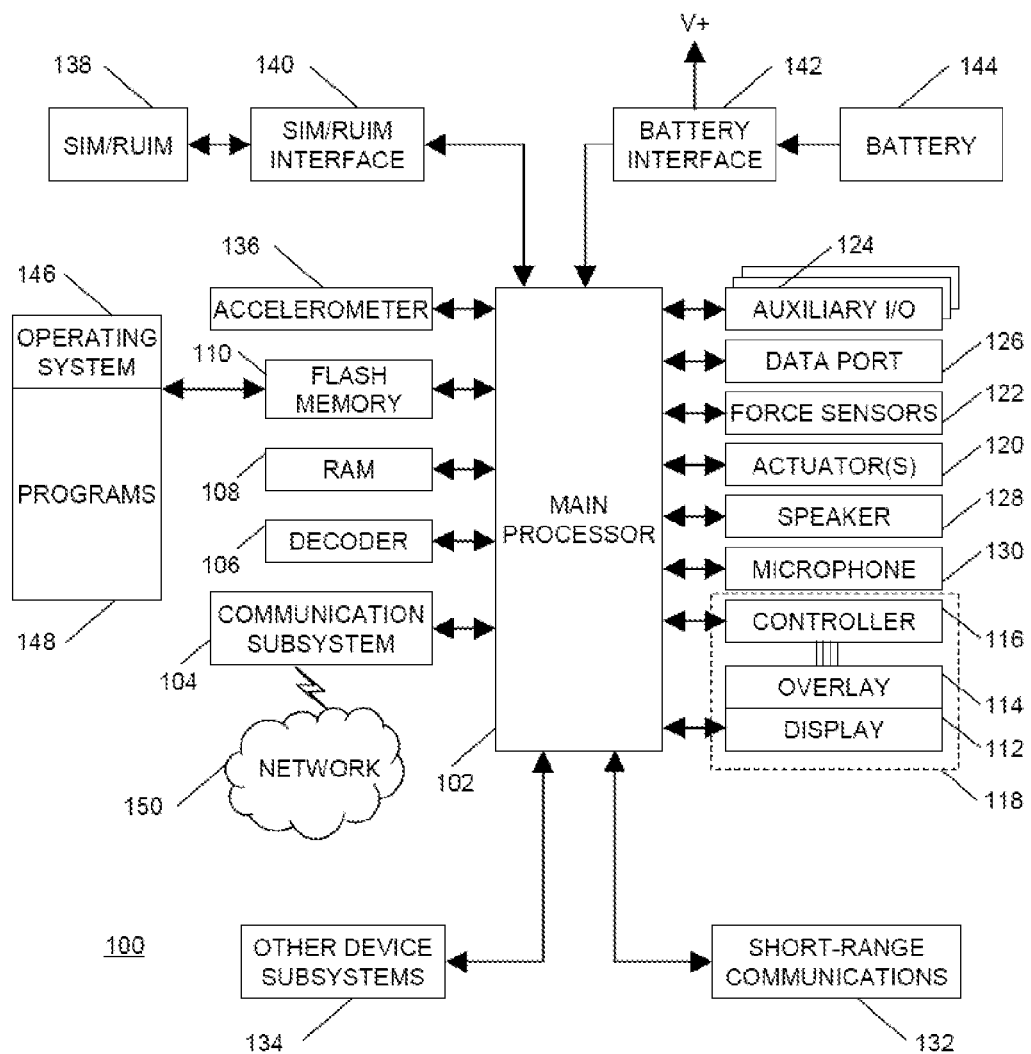
FIG. 1 is a simplified block diagram of components including internal components of a portable electronic device according to one embodiment.

The following describes an electronic device that includes a housing, a touch-sensitive display exposed by a front of the housing, and functional components comprising memory and a processor coupled to the memory and the touch-sensitive display.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

In other instances, well-known methods, procedures and components have not been described in detail so as not to obscure the example embodiments described herein. Also, the description is not to be considered as limited to the scope of the example embodiments described herein.

FIG. 1 shows a simplified block diagram of components including internal components of a portable electronic device 100 according to one embodiment.

The portable electronic device 100 includes multiple components such as a processor 102 that controls the operations of the portable electronic device 100. Communication functions, including data communications, voice communications, or both may be performed through a communication subsystem 104. Data received by the portable electronic device 100 may be decompressed and decrypted by a decoder 106. The communication subsystem 104 may receive messages from and send messages to a wireless network 150.

The wireless network 150 may be any type of wireless network, including, but not limited to, data-centric wireless networks, voice-centric wireless networks, and dual-mode networks that support both voice and data communications over the same physical base stations.

The portable electronic device 100 may be a battery-powered device and as shown includes a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together may comprise a touch-sensitive display 118, an actuator assembly 120, one or more optional force sensors 122, an auxiliary input/output (I/O) subsystem 124, a data port 126, a speaker 128, a microphone 130, short-range communications 132 and other device subsystems 134.

In some embodiments, user-interaction with the graphical user interface may be performed through the touch-sensitive overlay 114. The processor 102 may interact with the touch-sensitive overlay 114 via the electronic controller 116. Information, such as text, characters, symbols, images, icons, and other items that may be displayed or rendered on a portable electronic device may be displayed on the touch-sensitive display 118 via the processor 102.

In some embodiments, the processor 102 may also interact with an accelerometer 136 as shown in FIG. 1. The accelerometer 136 may include a cantilever beam with a proof mass and suitable deflection sensing circuitry. The accelerometer 136 may be utilized for detecting the direction of gravitational forces or gravity-induced reaction forces acting on the portable electronic device 100.

To identify a subscriber for network access according to the present embodiment, the portable electronic device 100 may use a Subscriber Identity Module or a Removable User Identity Module (SIM/RUIM) card 138 inserted into a SIM/RUIM interface 140 for communication with a network (such as the wireless network 150).

Alternatively, user identification information may be programmed into the flash memory 110 or performed using other techniques.

The portable electronic device 100 also includes an operating system 146 and software components 148 that are executed by the processor 102 and which may be stored in a persistent store such as the flash memory 110. Additional applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104.

For voice communications, the overall operation of the portable electronic device 100 is similar. The speaker 128 may output audible information converted from electrical signals, and the microphone 130 may convert audible information into electrical signals for processing.

Turning now to FIGS. 2 to 11, illustrated generally therein is a portable electronic device 200 according to some embodiments.

Figures 2, 3:
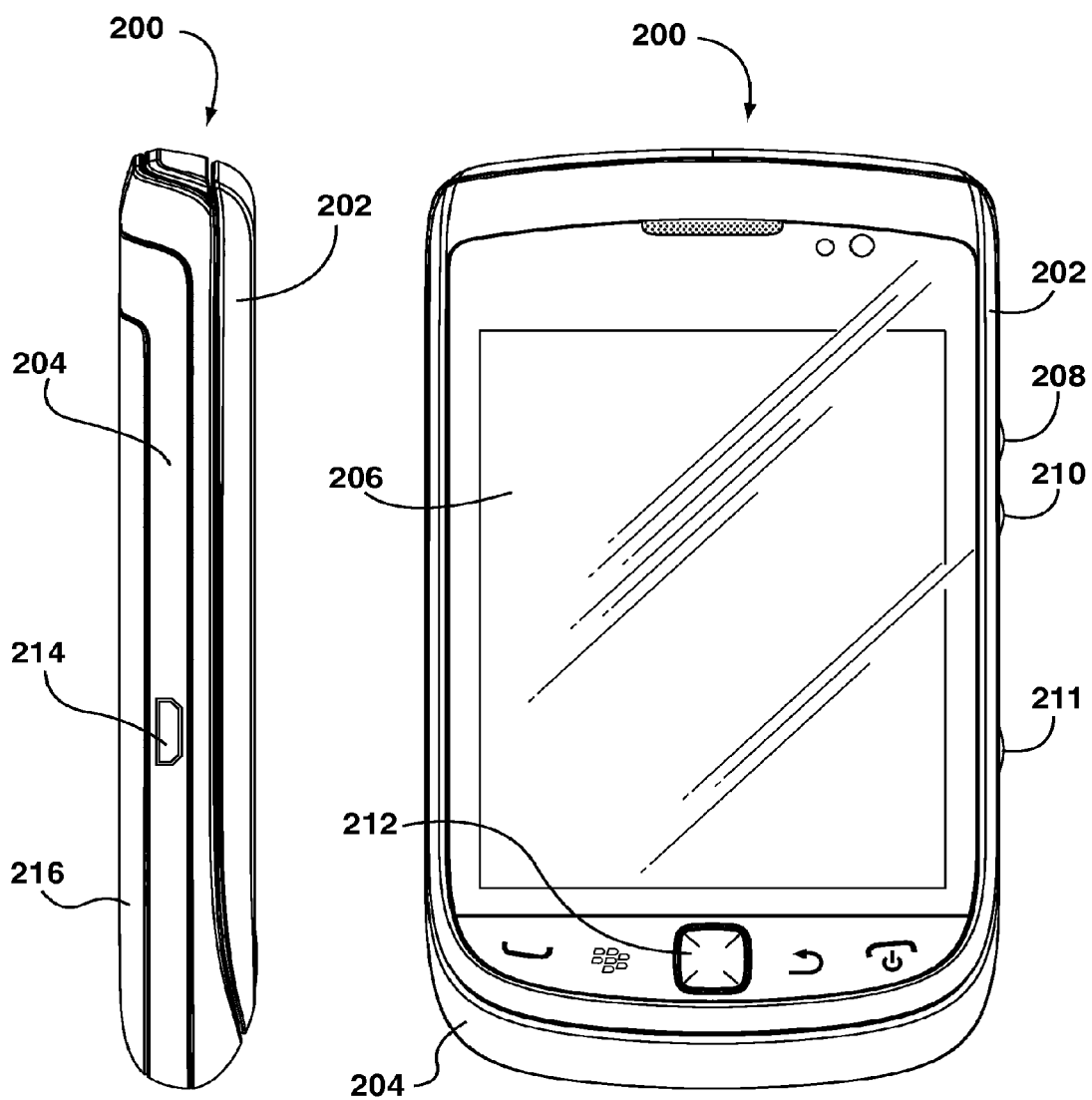
FIG. 2 is a first side view of a portable electronic device according to one embodiment shown in a closed position.
FIG. 3 is a front view of the portable electronic device of FIG. 2.
Figures 4, 5:
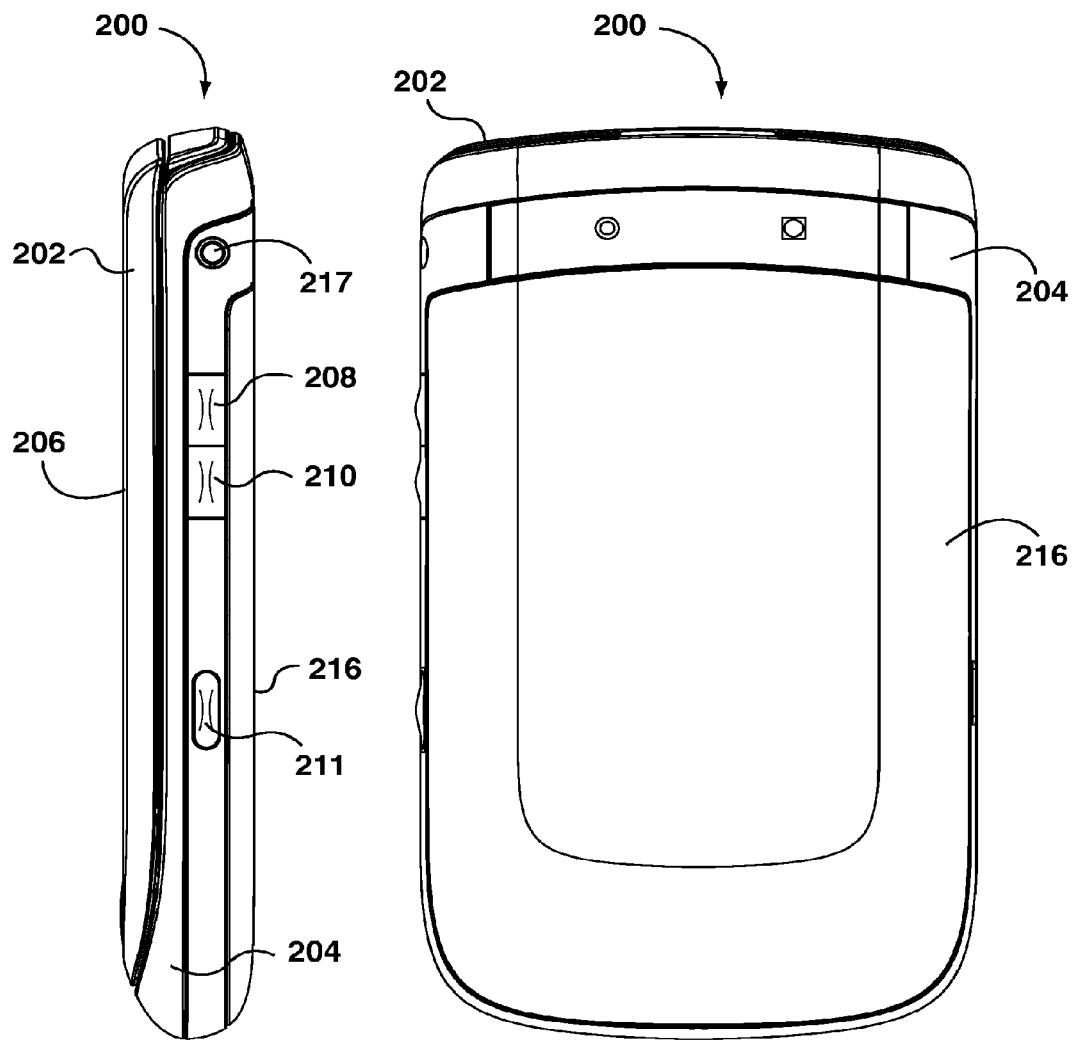
FIG. 4 is a second side view of the portable electronic device of FIG. 2.
FIG. 5 is a back view of the portable electronic device of FIG. 2.
Figures 8, 9:
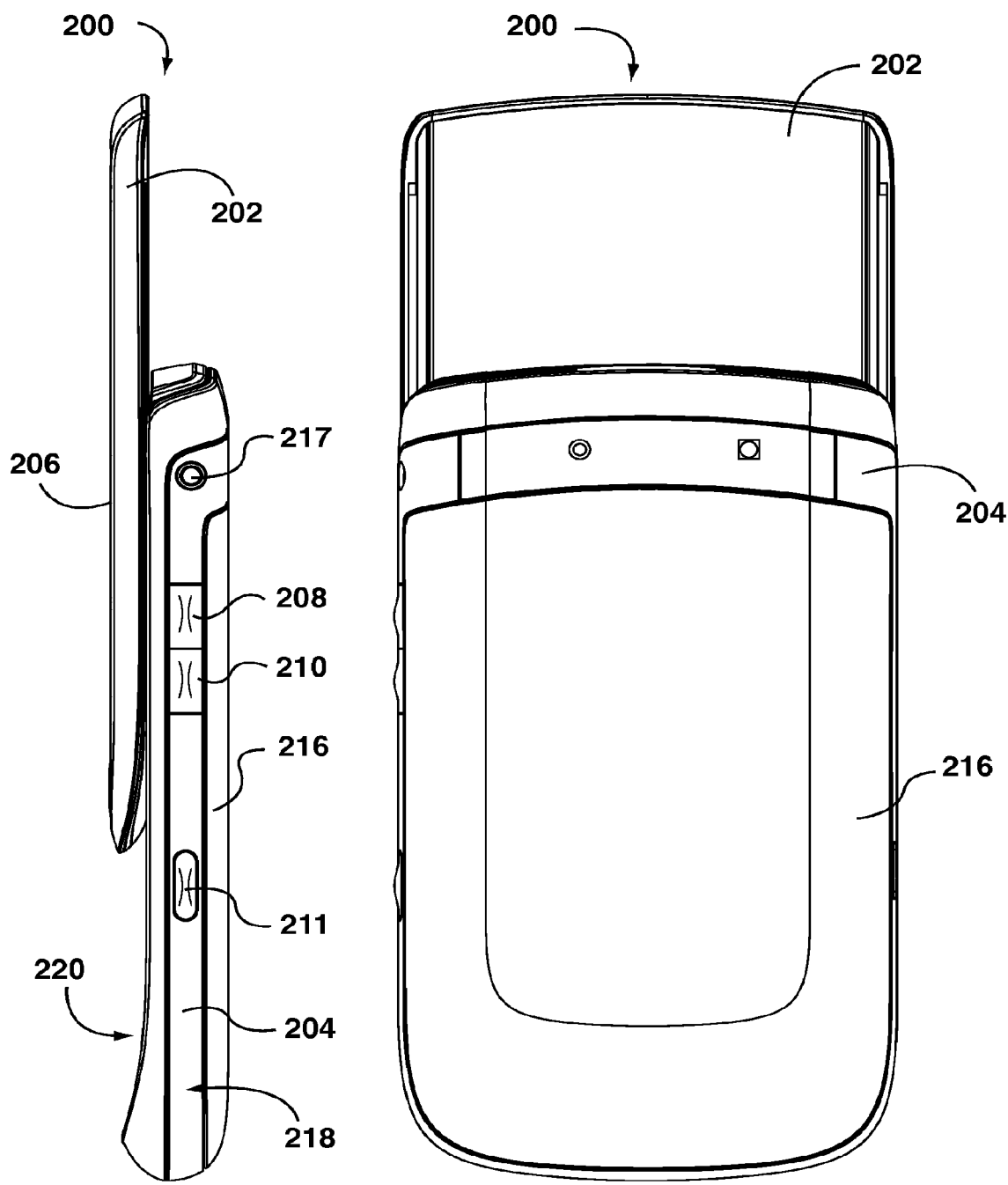
FIG. 8 is a second side view of the portable electronic device of FIG. 6.
FIG. 9 is a back view of the portable electronic device of FIG. 6.
Figure 10:
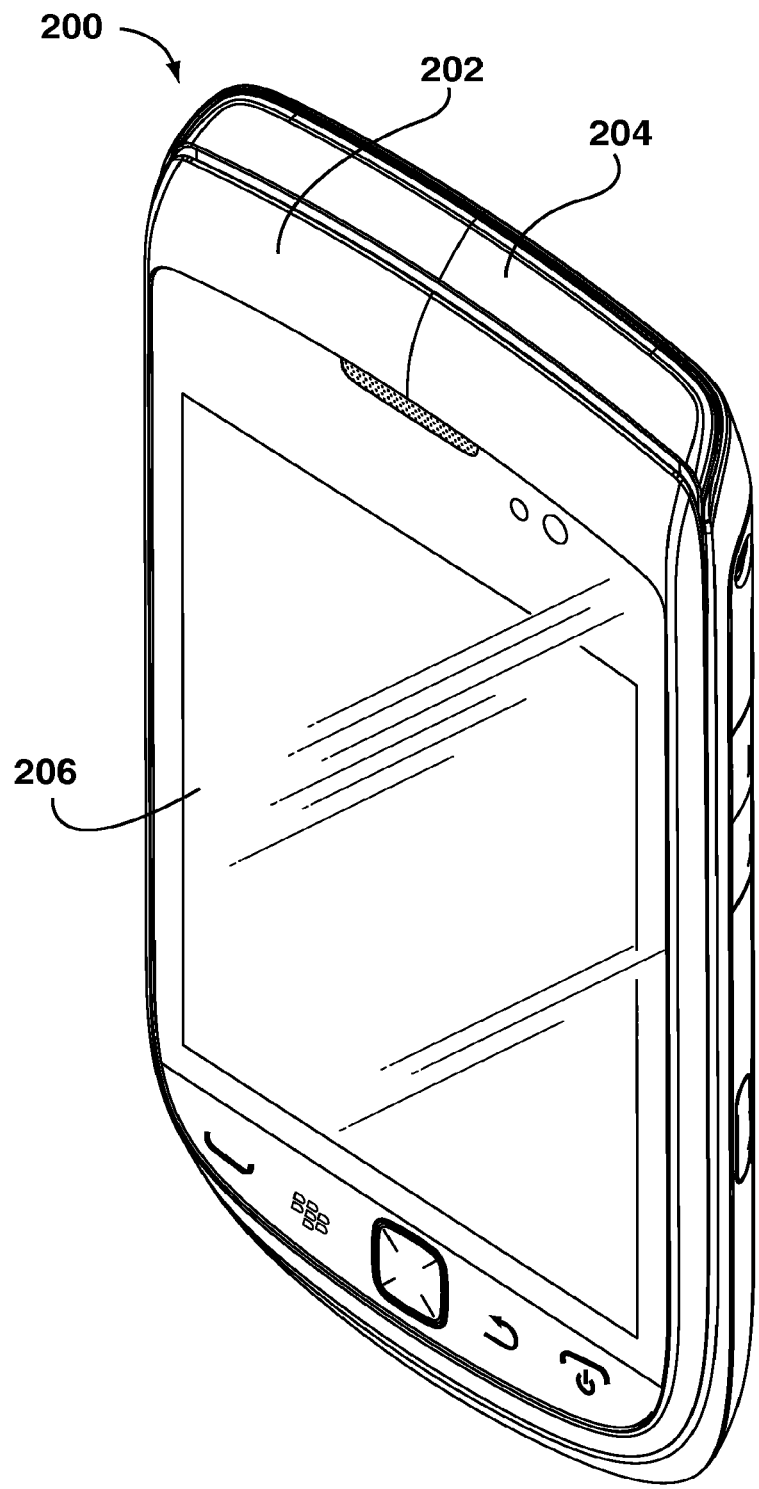
FIG. 10 is a perspective view of the portable electronic device of FIG. 2 shown in the closed position.
Figure 11:
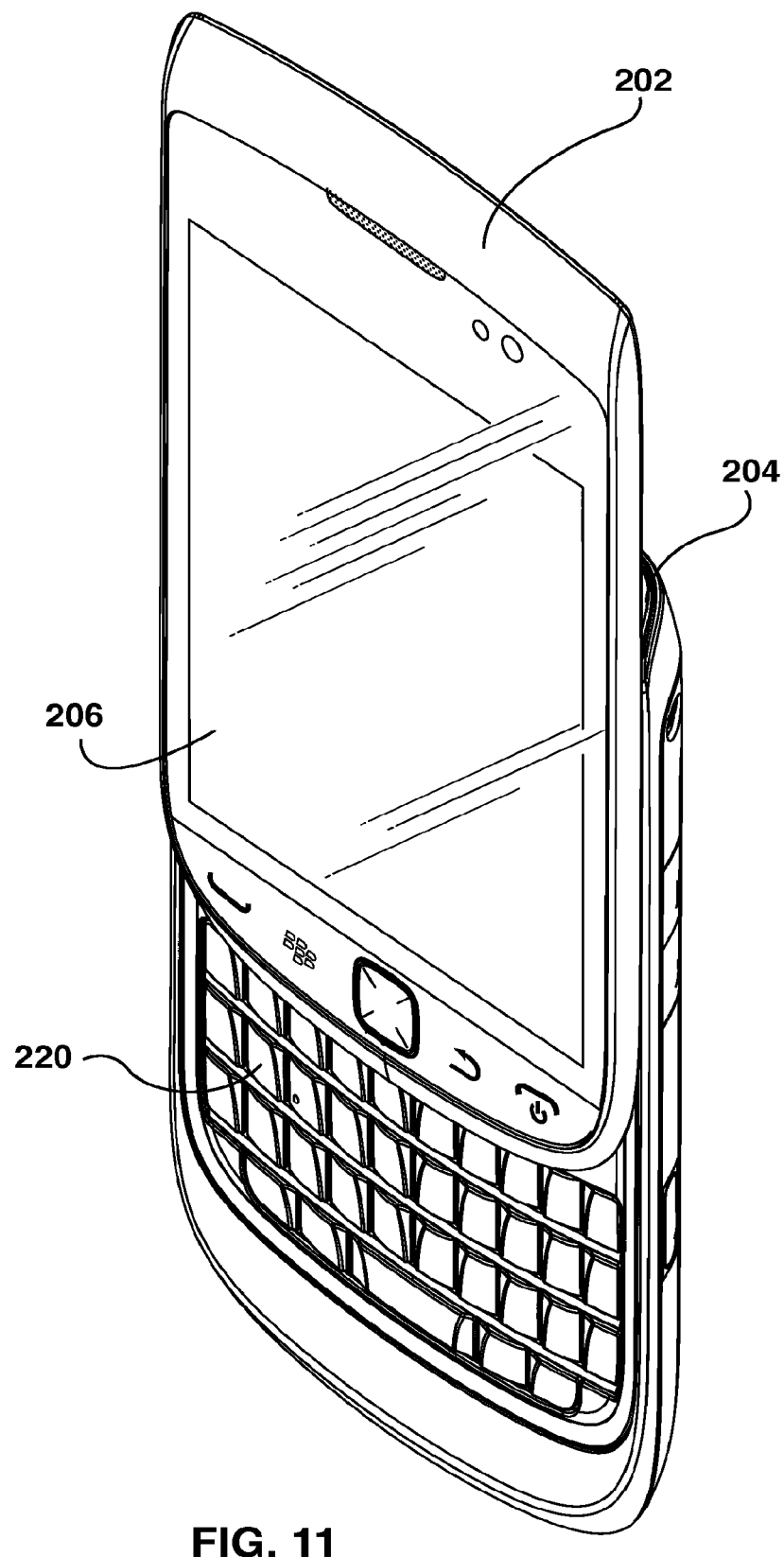
FIG. 11 is a perspective view of the portable electronic device of FIG. 6 shown in the open position.

The portable electronic device generally includes an upper housing 202 (or sliding portion) and a rear housing 204 (or base portion). The upper housing 202 and lower or rear housing 204 are coupled together and are slidable between a closed position (as shown in FIG. 2 for example) and an open position (as shown in FIG. 6 for example).

The upper housing 202 generally includes a display 206, which could be an LCD display and which may have touch screen capabilities. In some embodiments, the display 206 could be the same as or similar to the display 118 or the display 112 as generally described above.

One or both of the upper housing 202 and lower housing 204 may include one or more input apparatus, such as navigation keys or buttons, a physical or virtual keyboard, a trackpad, a trackball, multimedia keys, etc. For example, the upper housing 202 as shown includes an auxiliary input device 212. The auxiliary input device may be an optical navigation module (e.g. a trackpad) that responds to user interaction, and which may be used for navigating around the display screen 206, to select objects on the display screen, or for other purposes.

In some other embodiments, the auxiliary input device 212 may be a mechanical device that responds to user interaction (e.g. a trackball).

The display 206 and the auxiliary input device 212 are generally disposed on a front of the upper housing 202 and exposed for user accessibility regardless of whether the portable electronic device 200 is in the open or closed positions.

The upper housing 202 may also include other input devices, such as a dedicated phone application button, a dedicated "disconnect call" button, a home screen button, etc. In various embodiments, these input devices may include optical sensors, mechanical buttons, or both.

Turning now to the rear housing 204, the rear housing 204 may include various buttons and other controls, such as buttons 208 and 210. In some embodiments, buttons 208, 210 could be used for navigation, to control volume or for other purposes.

The rear housing 204 could also include one or more application buttons 211 that can be used for example to launch a particular application on the portable electronic device (e.g. a camera application, a phone application, etc.). In some embodiments, the button 211 may be configurable by a user (e.g. the user may be able to select the particular application launched by the button 211).

As shown in FIGS. 2 and 6, the rear housing 204 could also include one or more input or output ports, (e.g. I/O ports), such as a microUSB port 214 (and which could be similar to or the same as data port 126). In some examples, the port 214 may be used for data communication with the portable electronic device 200, for charging of a battery (not shown in FIGS. 2 and 6, but which could for example be battery 144) on the device 200 or for both.

As shown, the rear housing 204 may also include a battery cover 216 for covering the battery (e.g. battery 144, not shown in FIGS. 2 and 6). In some embodiments, the battery cover 216 may be removable. In other embodiments, the battery cover 216 may be permanently fixed to the device.

In some embodiments, the rear housing 204 may also include an audio jack 217. The audio jack 217 may be used to couple the portable electronic device 200 to a speaker, a microphone, or both, for example for use in voice communication, for listening to music on the portable electronic device 200, etc.

Turning now to FIGS. 6 to 9, as shown when the portable electronic device 200 is in the open position, a keypad 220 is exposed on a lower portion 218 of the rear housing 204. The keypad 220 generally includes a plurality of alphanumeric keys 222 for inputting data into and otherwise controlling the portable electronic device 200. As shown, the keys 222 may be positioned in a plurality of rows and columns. In some embodiments, the keys 222 may represent an alphabet and may be arranged with a standard keyboard layout (e.g. QWERTY, QWERTZ, DVORAK, etc.) or according to other particular patterns.

As shown in FIGS. 2 to 5, when the portable electronic device 200 is in the closed position, the keypad 220 is covered by the upper housing 202. This may be beneficial as it may protect the keypad 220 when not in use, and may also inhibit undesired keys from being pressed when the user is carrying the portable electronic device 200 (e.g. in a user's pocket).

In some embodiments (e.g. when the display 206 is a touchsceen), the user may be able to perform functions on the portable electronic device 200 while closed by interacting with the accessible input devices (e.g. using buttons 208, 210, 211, the auxiliary input device 212, the display screen 206 itself, etc.).

When the portable electronic device 200 is in the open position (as shown in FIGS. 6 to 9), the keypad 220 is exposed for user accessibility.

In some embodiments, the display 206 may be a touch-sensitive display. The touch-sensitive display may be a capacitive touch-sensitive display, for example, and a user's touch on the touch-sensitive display may be determined by determining an X and Y location of the touch, with the X location determined by a signal generated as a result of capacitive coupling with a first touch sensor layer and the Y location determined by the signal generated as a result of capacitive coupling with another touch sensor layer.

Each of the touch-sensor layers may provide a signal to a controller that represents the respective X and Y touch location values. Thus a feature such as a virtual button or other feature displayed on the touch-sensitive display may be selected by a mapping of the touch location to a feature on the touch-sensitive display.

In some embodiments, the portable electronic device 200 is generally taller than it is wide. In such embodiments, as the portable electronic device 200 moves between the open position and the closed position, the upper housing 202 and rear housing 204 move along a longitudinal axis of the portable electronic device 200.

Figure 12:
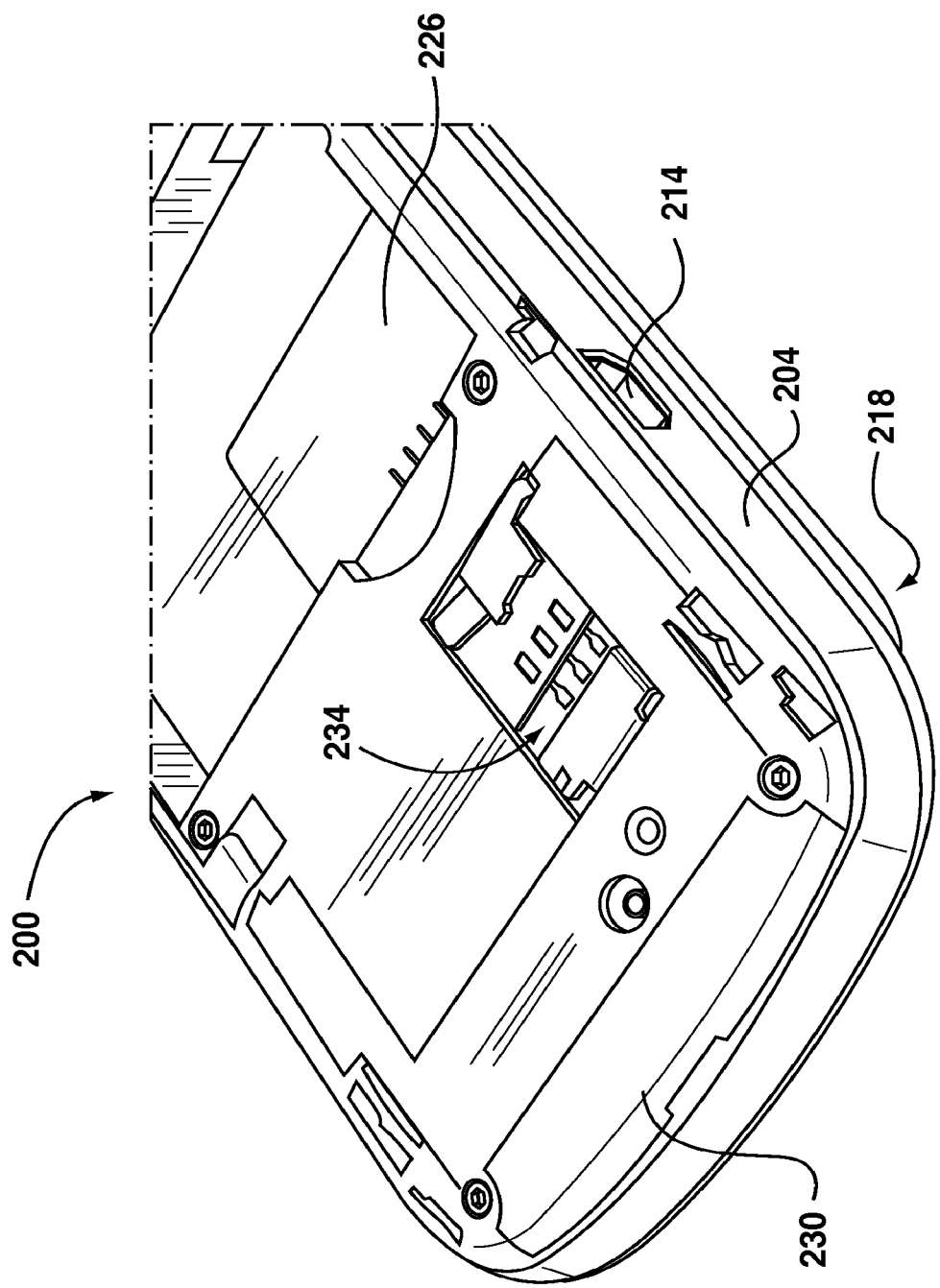
FIG. 12 is a rear perspective view of the portable electronic device of FIG. 2 with the battery cover removed.

Reference is now made to FIG. 12, which illustrates a rear perspective view of the rear housing 204 of the portable electronic device 200 with the battery cover 216 removed. As shown, the rear housing 204 includes a battery opening 226 for receiving a battery (e.g. battery 144, not shown in FIG. 12).

The rear housing 204 also includes an antenna 230, which may be used for sending and receiving voice communications, for data communications, or both. As shown, the antenna 230 is provided in the lower portion 218 of the rear housing 204. In some embodiments the antenna 230 may be tucked behind and abut an inner surface of the rear housing 204.

Figure 13:
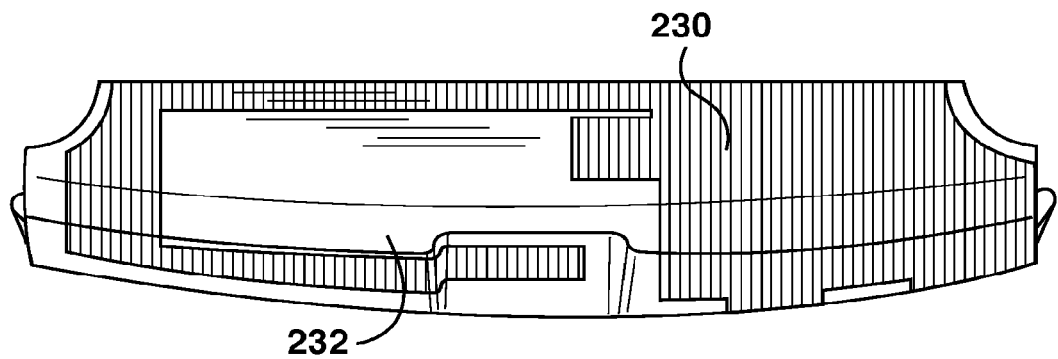
FIG. 13 is a close up view of the antenna of the portable electronic device of FIG. 12.

In some examples, the antenna 230 may be a standard planar inverted F antenna (PIFA), which may be designed to operate in various frequency bands as desired (e.g. around 850 MHz, 1900 MHz or other frequency bands according to the operating characteristics of a particular wireless communication network, such as the wireless network 150). In some embodiments, the antenna 230 may be a LDS surface etched antenna. In some embodiments, as shown in FIG. 13, the antenna 230 may include a plastic base layer 232.

Figure 14:
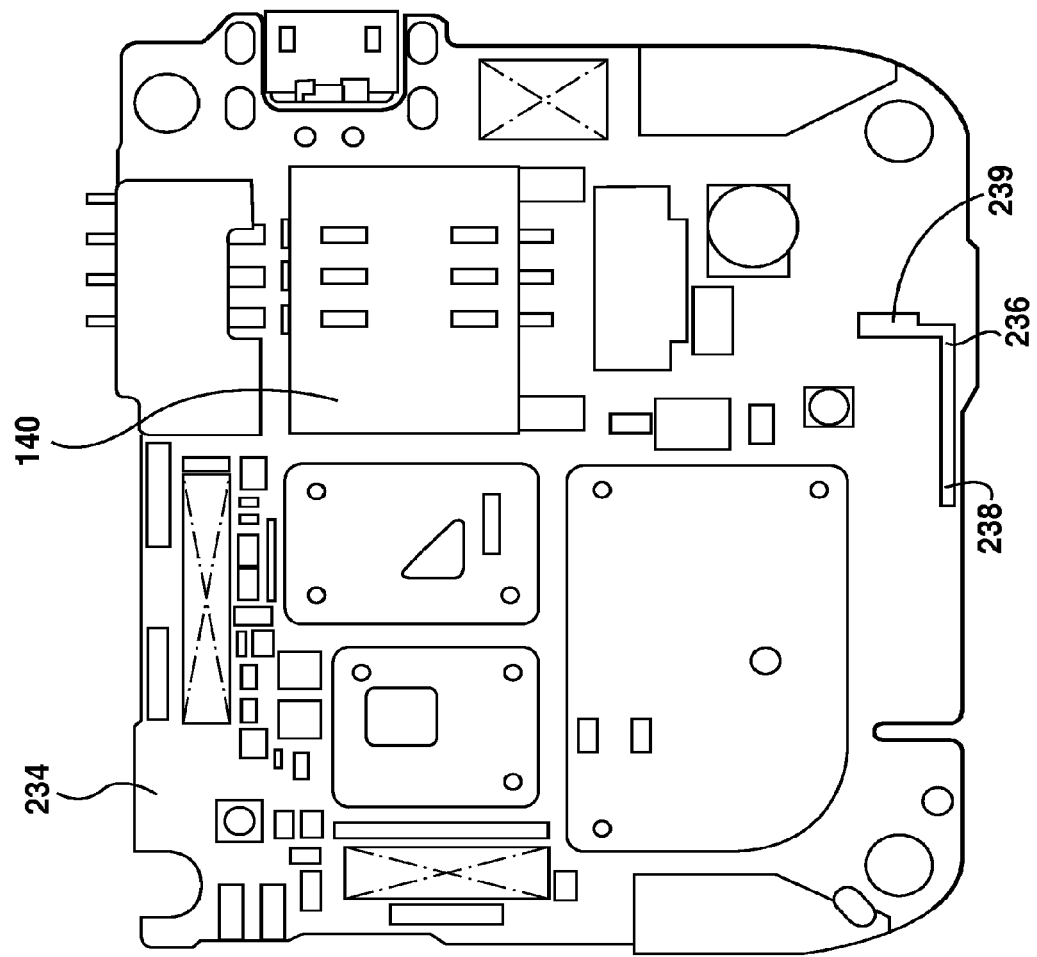
FIG. 14 is a close up view of a printed circuit board of the portable electronic device of FIG. 12 having a resonator thereon.

Also partially visible in FIG. 12 is a printed circuit board (PCB) 234, which is shown more clearly in FIG. 14.

The PCB 234 may include various electronic components as will be understood by a person skilled in the art, including a processor, a memory, and a SIM/RUIM interface 140, which may be used for receiving a SIM/RUIM and for communication with a network such as the wireless network 150.

As shown, in some embodiments the PCB 234 also includes a PCB resonator 236. Generally, the PCB resonator 236 is configured so as to improve the high frequency bandwidth response for the antenna 230. In particular, the PCB resonator 236 tends to broaden the overall high-frequency system bandwidth and thus improve antenna 230 performance.

In some embodiments, the PCB resonator 236 is generally planar, and has an "L" shape, with a first arm portion 238, and a second arm portion 239 that is generally perpendicular to the first arm portion 238. In other embodiments, the PCB resonator 236 may have other shapes and configurations.

In some embodiments, the PCB resonator 236 is an extension of a copper ground layer of the PCB 234. In this embodiment, in the area of the "L" shaped PCB resonator 236, there is generally no other copper through the thickness of that portion of the PCB 234. This tends to inhibit interference with the PCB resonator 236, and facilitates increasing the high frequency bandwidth response for the antenna 230.

Figure 15:
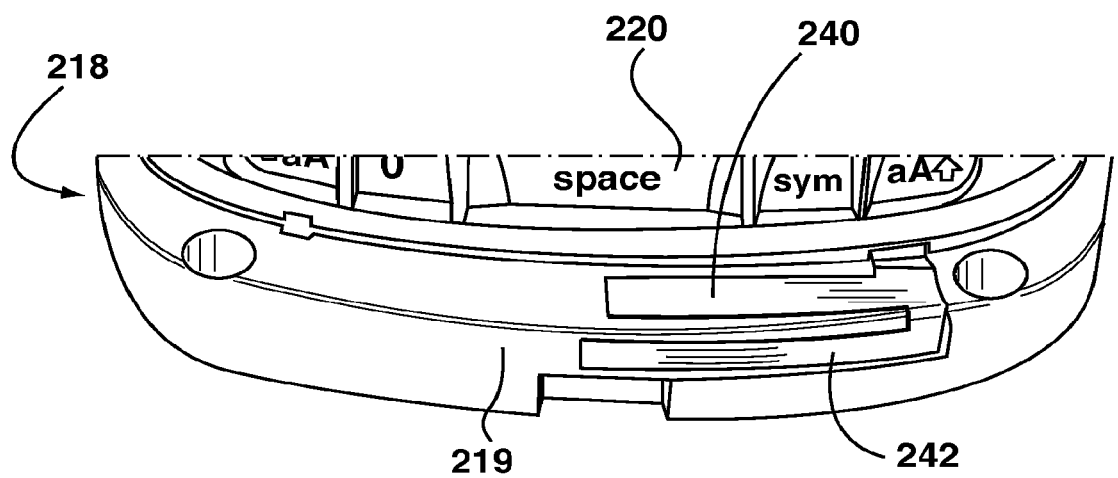
FIG. 15 is a close up view of a low frequency shield and high-frequency chassis resonator of the portable electronic device of FIG. 12.

Turning now to FIG. 15, illustrated therein are a low frequency shield 240 and a high frequency chassis resonator 242 for the portable electronic device 200 according to one embodiment.

The inventors have observed that, when a portable electronic device (e.g. portable electronic device 200) with slideable housings moves between a closed position (e.g. as shown in FIG. 2) and an open position (e.g. as shown in FIG. 6), the effective electrical length of the chassis of the portable electronic device changes. This can have an impact of the sensitivity of the antenna (e.g. antenna 230), particularly for lower frequencies.

For example, as the portable electronic device 200 is moved between the open and closed positions, this can normally result in a shift in the lower frequency response of about 50-60 MHz (e.g. from a base frequency of 850 MHz). In some cases, this can actually result in a shift from operating in one frequency band into another frequency band. This is generally undesirable as it can interfere with desired operation of the portable electronic device 200.

Accordingly, the low frequency shield 240 is sized, shaped and configured to act as a ground so as to anchor the response of the portable electronic device 200 and inhibit changes to the frequency response of the antenna 230 when the portable electronic device 200 is moved between the open position and closed position. In particular, in one example without the low frequency shield 240, the low frequency response of the portable electronic device 200 would shift lower by about 50 MHz when the portable electronic device 200 is closed; with the low frequency shield 240, this shift can be prevented or at least greatly inhibited.

In some embodiments, the low frequency shield 240 may be a stainless steel sheet metal component that is attached to a stainless steel component on a front housing of the lower portion 218 of the rear housing 204 (e.g. by laser welding and one or more points, such as at two points) The sheet metal then acts as a ground that tends to anchor the frequency response.

Turning now to the high frequency chassis resonator 242, the high frequency chassis resonator 242 is generally sized, shaped and configured to assist with higher frequency sensitivity of the antenna 230. In some embodiments, the high frequency chassis resonator 242 can be a sheet metal piece with a particular length selected (e.g. ¼ the length of the desired wavelength) so as to encourage higher frequency sensitivity.

In some embodiments, the low frequency shield 240 and high frequency chassis resonator 242 are one continuous component. For example, the low frequency shield 240 and high frequency chassis resonator 242 may be a continuous stainless steel sheet metal component that is attached to a stainless steel component on a front housing of the lower portion 218 by laser welding.

In other embodiments, one or both of the low frequency shield 240 and high frequency chassis resonator 242 may be made of other suitable materials.

In some embodiments, the low frequency shield 240 and high frequency chassis resonator 242 may cooperate to shield the antenna 230 from the slider assembly within the portable electronic device 200, and may function as a high frequency radiating element that tends to improve high frequency efficiency when the portable electronic device 200 is in the closed position.

In some embodiments, at least some of the resonator and shield elements (e.g. PCB resonator 236, the low frequency shield 240 and high frequency chassis resonator 242) may be tuned to work together so as to perform at least one of inhibiting low frequency shift and increasing high frequency sensitivity.

As shown, the low frequency shield 240 and high frequency chassis resonator 242 may be located on a front edge 219 of the lower portion 218 of the rear housing 204, which is generally on the front of the portable electronic device 200 opposite the antenna 230 (which is located on the back of the portable electronic device). In particular, the low frequency shield 240 and high frequency chassis resonator 242 may be located on the portable electronic device 200 near the antenna 230.

In other embodiments, other positions for the low frequency shield 240 and high frequency chassis resonator 242 may be suitable, which may depend on the location of the antenna 230.

In some examples, the low frequency shield 240 and high frequency chassis resonator 242 may be covered or concealed by part of the rear housing 204 (e.g. by a plastic portion of the rear housing 204) during normal use so as to inhibit the user from contacting the low frequency shield 240 or high frequency chassis resonator 242.

While the above description provides examples of one or more processes or apparatuses, it will be appreciated that other processes or apparatuses may be within the scope of the accompanying claims.

The invention claimed is:

1. A portable electronic device, comprising:
   a first housing;
   a second housing coupled to the first housing and movable relative thereto between a closed position and an open position;
   an antenna positioned in the first housing;
   a low frequency shield coupled to the antenna and adapted to inhibit changes to the frequency response of the antenna when the portable electronic device is moved between the open position and the closed position; and
   a high frequency chassis resonator coupled to the low frequency shield and adapted to increase high frequency sensitivity of the antenna.

2. The portable electronic device of claim 1, wherein the low frequency shield and the high frequency chassis resonator are a continuous metallic component.

3. The portable electronic device of claim 2, wherein the continuous metallic component is located on a front edge of the first housing generally opposite the antenna.

4. The portable electronic device of claim 2, wherein the antenna and continuous metallic component are located in a lower portion of the first housing.

5. The portable electronic device of claim 1, further comprising a PCB resonator.

6. The portable electronic device of claim 5, wherein the PCB resonator is configured so as to improve the high frequency bandwidth response for the antenna.

7. The portable electronic device of claim 5, wherein the PCB resonator is generally planar, and has a first arm portion and a second arm portion that is generally perpendicular to the first arm portion.

8. The portable electronic device of claim 5, wherein the PCB resonator is an extension of a copper ground layer of a PCB of the portable electronic device.

9. The portable electronic device of claim 8, wherein in an area of the PCB resonator, there is no other copper through a thickness of that portion of the PCB so as to inhibit interference with the PCB resonator.

10. The portable electronic device of claim 1, wherein the low frequency shield and the high frequency chassis resonator are covered by part of the first housing so as to inhibit a user from contacting the low frequency shield or the high frequency chassis resonator.

11. A portable electronic device, comprising:
    a first housing;
    a second housing coupled to the first housing and moveable relative thereto between a closed position and an open position;
    an antenna;
    a low frequency shield sized, shaped and configured to inhibit changes to the frequency response of the antenna when the portable electronic device is moved between the open position and the closed position; and
    a high frequency chassis resonator sized, shaped and configured to increase higher frequency sensitivity of the antenna.

12. The portable electronic device of claim 11, wherein the low frequency shield and the high frequency chassis resonator are a continuous component.

13. The portable electronic device of claim 12, wherein the low frequency shield and the high frequency chassis resonator are a continuous metallic component.

14. The portable electronic device of claim 11, wherein the low frequency shield is located near the antenna.

15. The portable electronic device of claim 11, wherein the high frequency chassis is located near the antenna.

16. The portable electronic device of claim 11, further comprising a PCB resonator configured so as to improve the high frequency bandwidth response for the antenna.

17. The portable electronic device of claim 11, wherein the antenna is provided in a lower portion of the first housing.

18. The portable electronic device of claim 17, wherein the low frequency shield comprises a sheet metal piece that is attached to a front of the lower portion of the first housing.

19. The portable electronic device of claim 11, wherein the high frequency chassis resonator comprises a sheet metal piece having a length selected so as to encourage high frequency sensitivity.

20. A portable electronic device, comprising:
    a first housing;
    a second housing coupled to the first housing and moveable relative thereto between a closed position and an open position;
    an antenna;
    a low frequency shield coupled to the antenna and configured to inhibit changes to the frequency response of the antenna when the portable electronic device is moved between the open position and the closed position, the low frequency shield comprising a sheet metal piece that is attached to the portable electronic device near the antenna; and
    a high frequency chassis resonator coupled to the antenna and configured to increase high frequency sensitivity of the antenna, the high frequency chassis resonator comprising a sheet metal piece having a length selected so as to encourage high frequency sensitivity.

* * * * *